(12) United States Patent
Wilson

(10) Patent No.: US 11,267,725 B2
(45) Date of Patent: Mar. 8, 2022

(54) SYSTEM AND METHOD FOR WATER PURIFICATION

(71) Applicant: CLOUDBURST INTERNATIONAL INC., Peaster, TX (US)

(72) Inventor: Edwin E. Wilson, Colleyville, TX (US)

(73) Assignee: Cloudburst International, Inc., Peaster, TX (US)

( * ) Notice: Subject to any disclaimer, the term of this patent is extended or adjusted under 35 U.S.C. 154(b) by 148 days.

(21) Appl. No.: 16/708,500

(22) Filed: Dec. 10, 2019

(65) Prior Publication Data

US 2020/0148554 A1 May 14, 2020

Related U.S. Application Data

(63) Continuation of application No. 14/946,010, filed on Nov. 19, 2015, now Pat. No. 10,508,044.
(Continued)

(51) Int. Cl.
*C02F 1/38* (2006.01)
*B01D 21/26* (2006.01)
(Continued)

(52) U.S. Cl.
CPC .............. *C02F 1/16* (2013.01); *B01D 1/0058* (2013.01); *B01D 1/0082* (2013.01);
(Continued)

(58) Field of Classification Search
CPC .. B01D 1/0058; B01D 1/0082; B01D 1/0094; B01D 1/30; B01D 1/305; B01D 19/0057;
(Continued)

(56) References Cited

U.S. PATENT DOCUMENTS 2,765,918 A * 10/1956 Fontein ..................... B04C 5/28
210/512.2
3,314,220 A 4/1967 Goldstein
(Continued)

FOREIGN PATENT DOCUMENTS

DE 102012107471 5/2014
RU 2050201 12/1995
(Continued)

OTHER PUBLICATIONS

Official Action for Russian Patent Application No. 2017119767 dated May 21, 2019 and its English translation.
(Continued)

*Primary Examiner* — Patrick Orme
(74) *Attorney, Agent, or Firm* — Renner, Otto, Boisselle & Sklar, LLP

(57) ABSTRACT

An apparatus for use in water purification including a cylindrical vessel comprising, within the cylindrical vessel, a first set of hydrocyclones, at least one intermediate set of hydrocyclones, and a final set of hydrocyclones, the sets of hydrocyclones arranged in series. In one embodiment, the hydrocyclones within each set of hydrocyclones are arranged in a parallel configuration, wherein each set of hydrocyclones is defined by a divider which causes the hydrocyclones in each set to operate in parallel. In one embodiment each hydrocyclone has a tangential inlet disposed within an inlet chamber of the cylindrical vessel and in fluid communication with an inlet connected to the inlet chamber, an overflow disposed within an overflow chamber of the cylindrical vessel, and an underflow disposed within an underflow chamber of the cylindrical vessel. In one embodiment, the cylindrical vessel comprises a first set of hydrocyclones and a second, final set of hydrocyclones.

12 Claims, 10 Drawing Sheets

Related U.S. Application Data

(60) Provisional application No. 62/083,143, filed on Nov. 21, 2014.

(51) Int. Cl.

| | | |
|---|---|---|
| *C02F 1/16* | (2006.01) | |
| *C02F 1/04* | (2006.01) | |
| *B01D 1/00* | (2006.01) | |
| *B01D 1/30* | (2006.01) | |
| *B01D 19/00* | (2006.01) | |
| *C02F 103/00* | (2006.01) | |
| *C02F 103/08* | (2006.01) | |
| *C02F 103/10* | (2006.01) | |
| *C02F 103/02* | (2006.01) | |
| *C02F 103/36* | (2006.01) | |

(52) U.S. Cl.
CPC ........... *B01D 1/0094* (2013.01); *B01D 1/305* (2013.01); *B01D 19/0057* (2013.01); *B01D 21/267* (2013.01); *C02F 1/048* (2013.01); *C02F 1/38* (2013.01); *C02F 2103/001* (2013.01); *C02F 2103/008* (2013.01); *C02F 2103/023* (2013.01); *C02F 2103/08* (2013.01); *C02F 2103/10* (2013.01); *C02F 2103/365* (2013.01); *C02F 2201/005* (2013.01); *C02F 2201/008* (2013.01); *C02F 2209/02* (2013.01); *C02F 2209/38* (2013.01); *C02F 2209/40* (2013.01)

(58) Field of Classification Search
CPC .......... B01D 21/267; C02F 1/048; C02F 1/16; C02F 1/38; C02F 2103/001; C02F 2103/008; C02F 2103/023; C02F 2103/08; C02F 2103/10; C02F 2103/365; C02F 2201/005; C02F 2201/008; C02F 2209/02; C02F 2209/38
See application file for complete search history.

(56) References Cited

U.S. PATENT DOCUMENTS

| | | |
|---|---|---|
| 3,344,042 A | 9/1967 | Hardesty |
| 4,065,527 A | 12/1977 | Graber |
| 4,260,480 A | 4/1981 | Lewis et al. |
| 4,462,899 A | 7/1984 | Wambsgans |
| 4,726,902 A | 2/1988 | Hubbard |
| 5,388,708 A | 2/1995 | Bouchillon et al. |
| 6,182,453 B1 | 2/2001 | Fosberg |
| 7,357,849 B2 | 4/2008 | Wright |
| 7,766,077 B2 | 8/2010 | Masters et al. |
| 7,866,380 B2 | 1/2011 | Masters et al. |
| 7,959,814 B2 | 6/2011 | Masters et al. |
| 8,043,509 B2 | 10/2011 | Thiers |
| 8,771,477 B2 | 7/2014 | Thiers |
| 9,102,545 B2 | 8/2015 | Riley et al. |
| 9,169,132 B2 | 10/2015 | Riley et al. |
| 9,802,836 B2 | 10/2017 | Thiers |
| 2002/0050478 A1 | 5/2002 | Talbert et al. |
| 2003/0070430 A1 | 4/2003 | Beckius et al. |
| 2006/0260788 A1 | 11/2006 | Masters et al. |
| 2011/0017584 A1 | 1/2011 | Stevenson et al. |
| 2011/0174605 A1 | 7/2011 | Ugolin |
| 2014/0090970 A1 | 4/2014 | Riley et al. |
| 2014/0299462 A1* | 10/2014 | Thiers ............... F28D 15/0275 203/10 |
| 2015/0209692 A1 | 7/2015 | Vyskocil |

FOREIGN PATENT DOCUMENTS

| | | |
|---|---|---|
| RU | 13212 | 3/2000 |
| RU | 2487838 | 7/2013 |
| WO | 1999064112 | 12/1999 |
| WO | 2008104900 | 9/2008 |

OTHER PUBLICATIONS

PCT/US2015/061583; PCT International Preliminary Report on Patentability dated Mar. 10, 2017.
Korean Intellectual Property Office, International Search Report and Written Opinion for PCT/US2015/061583, dated Feb. 29, 2016—11 pp.
DE102012107471A1 (EPO Machine Tranlation) (Year: 2019).

* cited by examiner (SECTION A-A)

(SECTION B-B)

(SECTION C-C)

TIMING FOR EACH STAGE THROUGH
DIVIDER IS SLIGHTLY ADVANCED FROM
THE UPPER INLET SECTION (SECTION D-D)

SYSTEM AND METHOD FOR WATER PURIFICATION

CROSS-REFERENCE TO RELATED APPLICATIONS

The present application is a continuation of and claims priority to U.S. application Ser. No. 14/946,010, filed 19 Nov. 2015, now U.S. Pat. No. 10,508,044, which in turn claims benefit of and priority to U.S. Provisional Application No. 62/083,143 filed 21 Nov. 2014, both of which are hereby incorporated by reference in their entireties.

TECHNICAL FIELD OF THE INVENTION

The present invention relates generally to the field of purifying water and, more particularly, to a system and method for purifying water such as contaminated water or seawater.

BACKGROUND OF THE INVENTION

As described in U.S. Pat. Nos. 7,866,380 and 7,959,814, one of the most pressing needs throughout the world is drinkable water. An untold number of humans die every year because the water they consume is contaminated. In some areas, people are forced to spend a great deal of time manually hauling water from a distant source to their homes and villages rather than taking the risk of drinking untested water that might be nearby.

There are many methods of purifying water. One of the most common is reverse osmosis (RO). This process has been around for a long time, but it has its drawbacks. Although RO systems can be inexpensive, there is an ongoing maintenance requirement of filter replacement. Filters in RO systems can become clogged and/or damaged by constant exposure to the water source being purified. Cost and availability of replacement filters and the skill level to perform this maintenance requirement can present a problem.

Another method of water purification includes adding chemicals to the water to kill pathogens. Generally, chemical applications are used for situations where small amounts of water need purification. Although effective when the proper concentrations of chemicals are used, it is difficult to always measure the proper amounts. In addition, this system of purification does not address problems with heavy metals that may be present in water.

Boiling water is another way of killing pathogens in water. Unfortunately, in many parts of the world where contaminated water is a major problem, the availability of materials to heat water, such as wood, does not exist.

In particular areas or industries, hot water and/or steam may be needed, but it may be critical that no open flames be used to heat the water. One such industry is the oil field service industry. In many geographical regions oil reservoirs are found to contain high concentrations of paraffin, a waxy crystalline hydrocarbon. This substance, while commercially useful in the manufacture of coatings, sealants, candles, rubber compounding, pharmaceuticals and cosmetics, can present a problem with regard to the production of oil. Paraffin suspended in the crude oil tends to clog perforations in the oil well's production string and slows the flow of crude oil to the surface.

Several technologies have been in use for many years to minimize the detrimental effects of paraffin. Among these is injecting hot water, steam or chemical solvents into the well to clean out the wells perforations by liquefying the paraffin either by heating it above its melting point or chemically changing its composition. While effective, all of these have their shortcomings.

When the hot water method is employed, water must be transported to the well site then heated in a LPG or diesel fired boiler mounted either on a truck chassis or trailer. Availability of water at the well site is a common problem, and unsafe conditions exist when an open flame, like those used to heat water or crude in the boiler tanks, is positioned near the wellhead where there may be a high concentration of natural gas in the atmosphere.

The steam method usually entails the building of a power plant utilizing the field's natural gas to produce electricity and piping the waste steam to various wellheads for injection. While this eliminates the open flame close to the wellhead, it can involve a large capital expenditure that may become economically viable only when there is a large concentration of wells in a relatively small area. Piping steam to isolated outlying wells is sometimes not viable because too much heat may be lost before the steam gets to the wells. This may cause only distilled water to be delivered to the wellhead.

The chemical solvent method locates a container of solvent near the wellhead, and then injects it down hole with each stroke of the well's pumping unit. While this method eliminates open flames near the wellhead and does not require large capital expenditures, it does add substantial cost to the operation. The chemicals are expensive, costs associated with the transportation and handling of hazardous chemicals is expensive, and the addition of these chemicals to the crude oil makes the refining process more expensive.

Another problem that has become of increasing importance is the treatment and/or disposal of produced water and frac water from oil and gas wells due to the large amounts of water required for hydraulic fracturing and public concerns over drinking water contamination.

SUMMARY OF THE INVENTION

The present invention provides a system and method of purifying (to drinking water standards) contaminated water, including sea water, oilfield frac water, acid mine run off water, sewage water, etc. utilizing a process to effect separation of suspended solids through centrifugal force and a change of phase to remove dissolved solids. This process also kills bacteria as well as removes VOC's (volatile organic compounds). No filters, membranes or chemicals are required.

One embodiment of the present invention provides a water purification system that includes a high temperature water tank, a flameless heat source, a cylindrical vessel (hydrocyclone nest), a first pump, a steam production meter, and a steam condenser and heat exchanger. The high temperature water tank has a first water inlet, a second water inlet, a first water outlet and a second water outlet. The flameless heat source has an inlet connected to the second water outlet of the high temperature water tank and an outlet connected to the second water inlet of the high temperature water tank. The cylindrical vessel (hydrocyclone nest) is disposed within the high temperature water tank, and has an overflow chamber, an underflow chamber, an inlet chamber disposed between the overflow chamber and the underflow chamber, a first outlet connected to the overflow chamber, an inlet connected to the inlet chamber, and a second outlet connected to the underflow chamber. One or more sets of hydrocyclones are disposed within the cylindrical vessel.

The hydrocyclones within each set of hydrocyclones are arranged in a parallel configuration, and each hydrocyclone has a tangential inlet disposed within the inlet chamber of the cylindrical vessel, a overflow disposed within the overflow chamber of the cylindrical vessel and an underflow disposed within the underflow chamber of the cylindrical vessel. The first pump is connected to the first outlet of high temperature water tank and the inlet of the cylindrical vessel. The steam production meter is connected to the first outlet of the cylindrical vessel. The steam condenser and heat exchanger has a steam inlet and a purified water outlet, wherein the steam inlet is connected to the steam production meter.

Another embodiment of the present invention provides a water purification system that includes a source of contaminated water, an oil/solids separator, a third pump, a low temperature water tank, an engine, a heat exchanger, a fifth pump, a high temperature water tank, a second pump, a flameless heat source, a heat absorption valve, a cylindrical vessel (hydrocyclone nest), a first pump, a steam demister, a steam production meter, a steam condenser and heat exchanger, and a fourth pump. The third pump is connected to the source of the contaminated water and the oil/solids separator. The low temperature water tank has a liquid/gas separator, a first inlet connected to the oil/solids separator, a second inlet, a third inlet, a fourth inlet, a first water outlet, a second water outlet, a third water outlet and a gas outlet. The engine has a fuel intake connected to a fuel tank and the gas outlet of the low temperature water tank, and an exhaust connected to the second inlet of the low temperature water tank. The heat exchanger is thermally connected to the engine to cool the engine, and having a water inlet and a water outlet connected to the third inlet of the low temperature water tank. The fifth pump is connected to the third water outlet of the low temperature water tank and the water inlet of the heat exchanger. The high temperature water tank has a first water inlet, a second water inlet, a first water outlet and a second water outlet. The second pump is connected to the first water outlet of the low temperature water tank and the first inlet of the high temperature water tank. The flameless heat source has an inlet connected to the second water outlet of the high temperature water tank and an outlet connected to the second water inlet of the high temperature water tank. The heat absorption valve is connected between the flameless heat source and the low temperature water tank. The cylindrical vessel (hydrocyclone nest) is disposed within the high temperature water tank, and has an overflow chamber, an underflow chamber, an inlet chamber disposed between the overflow chamber and the underflow chamber, a first outlet connected to the overflow chamber, an inlet connected to the inlet chamber, and a second outlet connected to the underflow chamber. One or more sets of hydrocyclones are disposed within the cylindrical vessel. The hydrocyclones within each set of hydrocyclones are arranged in a parallel configuration, and each hydrocyclone has a tangential inlet disposed within the inlet chamber of the cylindrical vessel, a overflow disposed within the overflow chamber of the cylindrical vessel and an underflow disposed within the underflow chamber of the cylindrical vessel. The first pump is connected to the first outlet of high temperature water tank and the inlet of the cylindrical vessel. The steam demister is connected to the first outlet of the cylindrical vessel and the fourth water inlet of the low temperature water tank. The steam production meter is connected to the steam demister. The steam condenser and heat exchanger has a steam inlet, a purified water outlet, a water inlet and a water outlet, wherein the steam inlet is connected to the steam production meter, and the water outlet is connected to the second inlet of the low temperature water tank. The fourth pump is connected to the second water outlet of the low temperature water tank and the water inlet of the condenser or heat exchanger.

Yet another embodiment of the present invention provides a method for purifying contaminated water. The contaminated water is heated within a high temperature water tank using a flameless heat source, wherein the heated contaminated water heats a cylindrical vessel and one or more sets of hydrocyclones. The heated contaminated water is pumped into an inlet of the cylindrical vessel such that the heated contaminated water enters a tangential inlet of the hydrocyclones, the hydrocyclones separate the heated contaminated water into steam and solids/concentrate, the steam exits through an overflow of the hydrocyclones and a first outlet of the cylindrical vessel, the solids and concentrate exit through an underflow of the hydrocyclones and a second outlet of the cylindrical vessel. The steam is condensed into purified water using a steam condenser and heat exchanger. The heated contaminated water is maintained within the high temperature water tank within a specified temperature range using a controller.

Yet another embodiment of the present invention provides a method for purifying contaminated water. The contaminated water is preheated in a low temperature water tank by: (1) pumping the contaminated water from the low temperature water tank to a water inlet of a steam condenser and heat exchanger where a first heat from a steam is transferred to the contaminated water, and (2) pumping the contaminated water from the low temperature water tank to an inlet of a heat exchanger thermally coupled to an engine where a second heat from the engine is transferred to the contaminated water. The preheated contaminated water is further heated and volatile gases from the engine are trapped by mixing the preheated contaminated water from a water outlet of the steam condenser and heat exchanger with exhaust gases from the exhaust of the engine. The trapped volatile gases are separated from the preheated contaminated water using a liquid/gas separator within the low temperature water tank. The separated volatile gases are mixed with a fuel and the separated volatile gases and the fuel are burned in the engine. The preheated contaminated water is pumped from the low temperature water tank to a high temperature water tank. The contaminated water is heated within a high temperature water tank using a flameless heat source, wherein the heated contaminated water heats a cylindrical vessel and one or more sets of hydrocyclones. The heated contaminated water is pumped into an inlet of the cylindrical vessel such that the heated contaminated water enters a tangential inlet of the hydrocyclones, the hydrocyclones separate the heated contaminated water into steam and solids/concentrate, the steam exits through an overflow of the hydrocyclones and a first outlet of the cylindrical vessel, the solids and concentrate exit through an underflow of the hydrocyclones and a second outlet of the cylindrical vessel. The steam is condensed into purified water using a steam condenser and heat exchanger. The heated contaminated water is maintained within the high temperature water tank within a specified temperature range using a controller.

Other technical advantages will be readily apparent to one skilled in the art from the following figures, descriptions and claims. Moreover, while specific advantages have been enumerated above, various embodiments may include all, some or none of the enumerated advantages.

BRIEF DESCRIPTION OF THE DRAWINGS

The above and further advantages of the invention may be better understood by referring to the following description in conjunction with the accompanying drawings, in which.

DETAILED DESCRIPTION OF THE INVENTION

Figure 1:
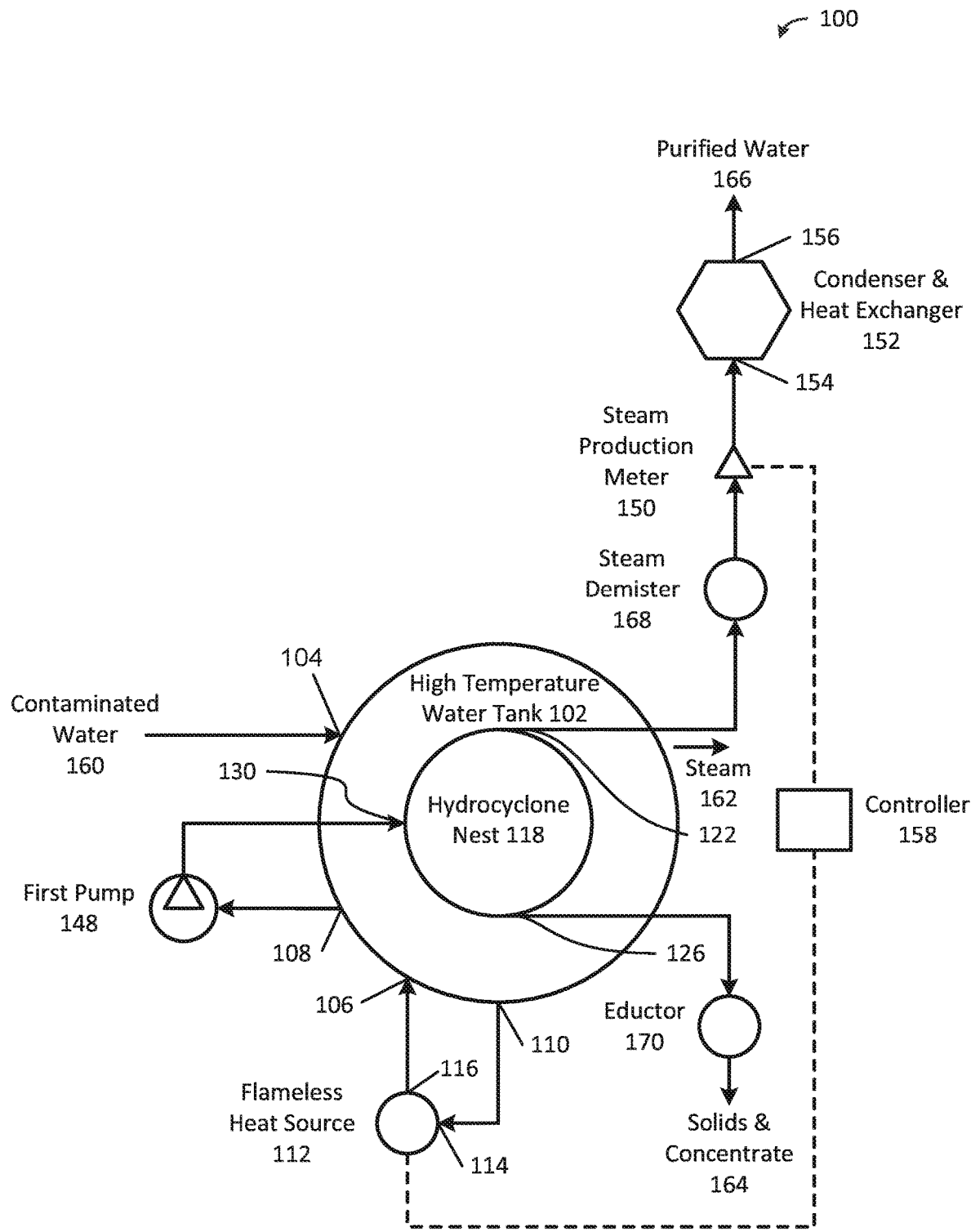
FIG. 1 is a block diagram of a water purification system in accordance with one embodiment of the present invention.
Figure 2A:
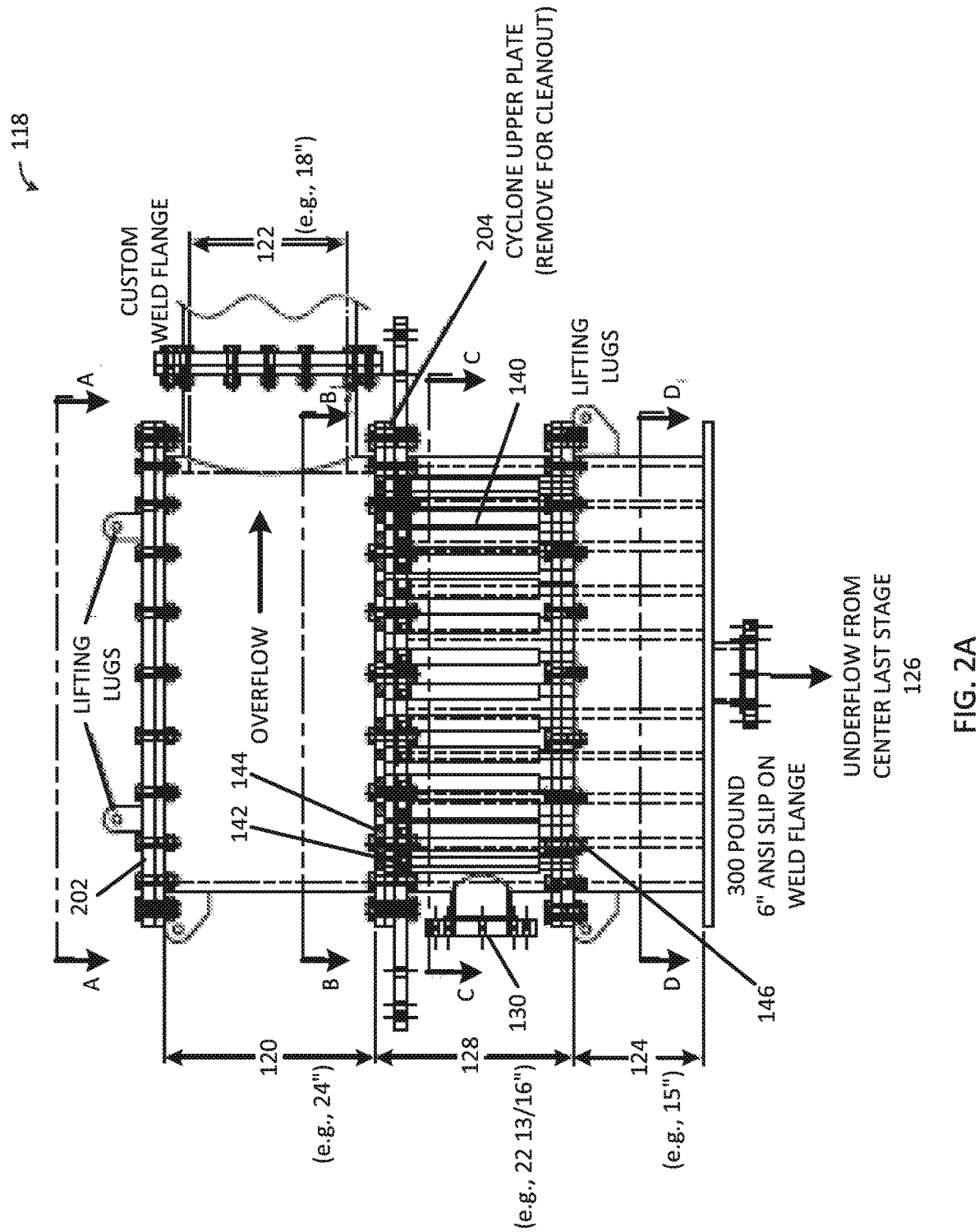
FIGS. 2A-2E are diagrams of a cylindrical vessel (hydrocyclone nest) in accordance with one embodiment of the present invention.
Figure 2B:
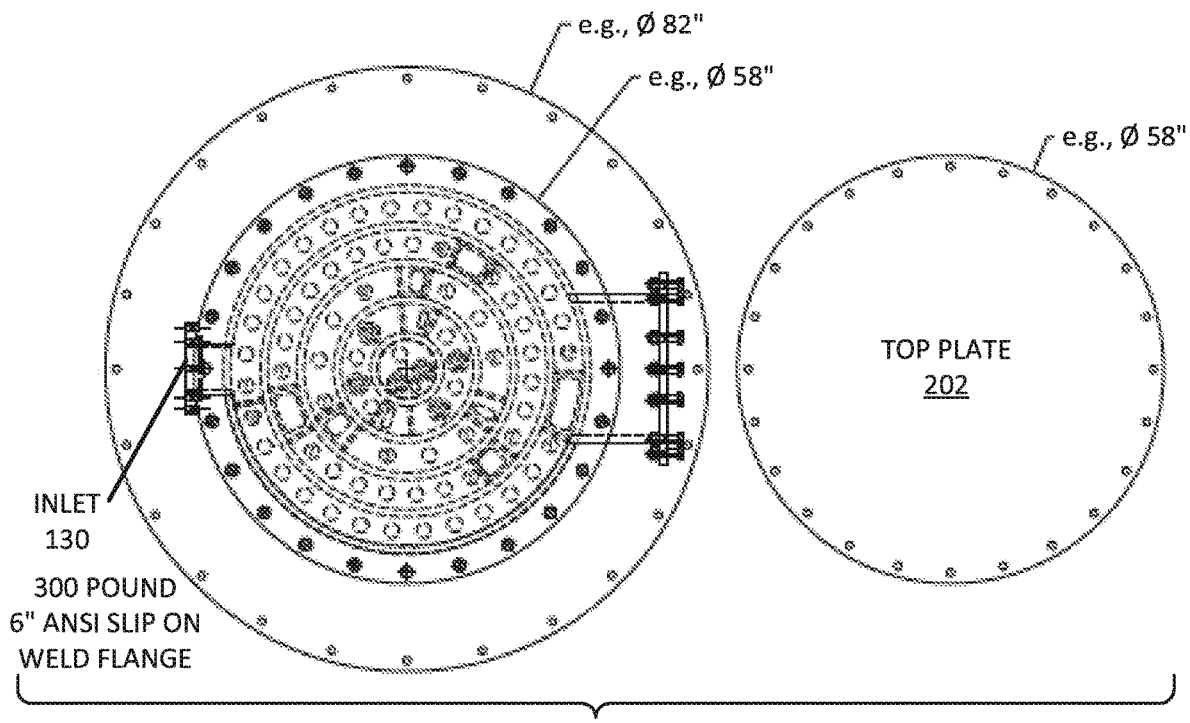
Figure 2C:
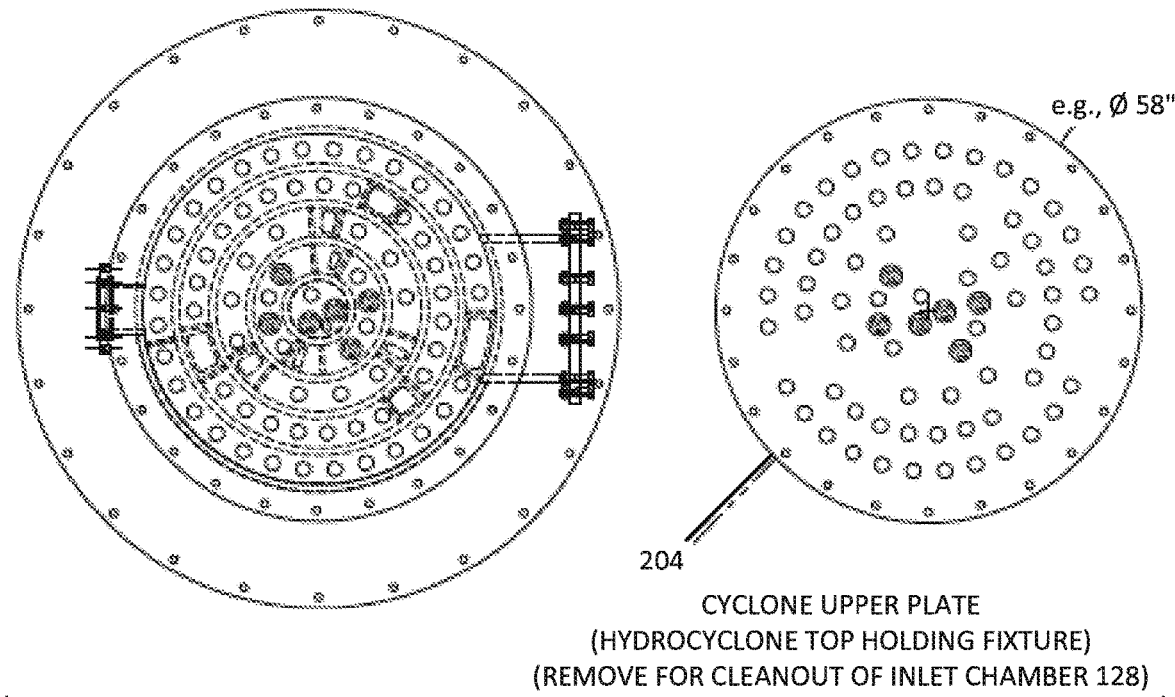
Figure 2D:
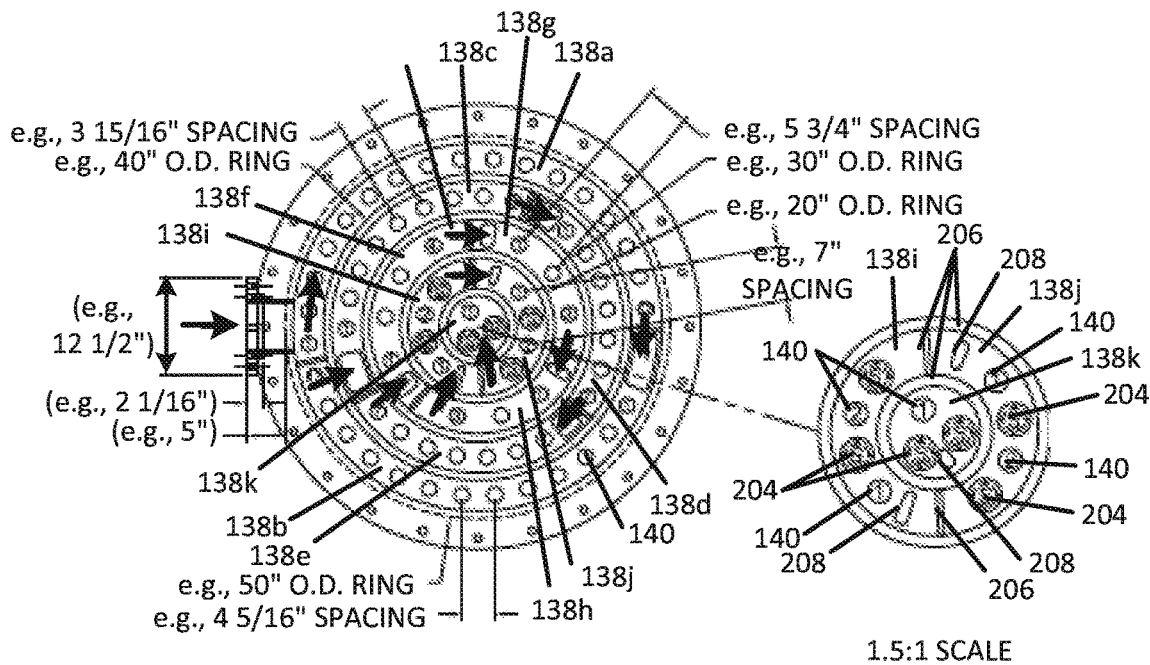
Figure 2E:
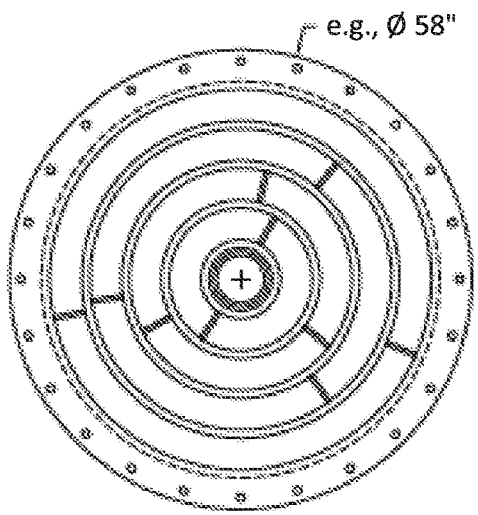

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention. The discussion herein relates primarily to purifying contaminated water (i.e., any water that is not suitable for human consumption), but it will be understood that the concepts of the present invention are applicable to any system and method for treating liquids.

The present invention provides a system and method of purifying (to drinking water standards) contaminated water, including sea water, oilfield frac water, acid mine run off water, sewage water, etc. utilizing a process to effect separation of suspended solids through centrifugal force and a change of phase to remove dissolved solids. This process can also kill bacteria as well as remove VOC's (volatile organic compounds). No filters, membranes or chemicals are required.

Water to be processed is preheated for the process by any number of ways including the flameless method described in U.S. Pat. No. 7,866,380 B2 (Issued Jan. 11, 2011) "System and Method for Producing Hot Water without a Flame" and U.S. Pat. No. 7,959,814 B2 (Issued Jun. 14, 2011) "System and Method for Producing Hot Water Without a Flame", which are hereby incorporated by reference in their entirety. Other methods include geothermal, industrial process or power plant waste heat. Virtually any form of waste heat can be utilized.

This preheated water is introduced into a high pressure (e.g., 400 psi), high temperature (up to 300° F.), non-vented process tank. The temperature of this water is variable depending on its chemistry (boiling point). In operation, the water is continuously withdrawn by this tank by a medium pressure (e.g., 100 psi) pump that imparts kinetic energy into the hot water (the water contains heat energy but it is maintained as a liquid under pressure).

The flow of water is introduced into a "nest" of hydrocyclones that are heated to the temperature of the incoming water by being submerged in the non-vented tank. The hydrocyclones are functionally arranged both parallel and in series. The heated water tangentially enters the first "group" of hydrocyclones that are manifolded in a parallel arrangement. Individual orifices increase the velocity of the water creating forces of up to 100 g's. These forces cause the solids in to a laminar flow of water on the outside of the hydrocyclone. Dissolved solids are also forced to the outside creating fresher water (with a lower boiling point) and a low pressure area (tornado effect) in the center. The water (still liquid) works its way down the hydrocyclone where near the bottom its vertical velocity stops. At this point the water is allowed to flash to steam and exit through a vortex tube in to a steam chest where the steam output of all hydrocyclones is allowed to collect.

Even though the hydrocyclones are heated to temperature of the process water (due to the heat of evaporation of the water) the water is not all flashed to steam. This water, now more concentrated and with a higher boiling point, is directed in series to another parallel group or set of hydrocyclones in parallel where the process is repeated. This is continued throughout the "nest" of hydrocyclones until the maximum amount of water is flashed to steam and still allowing flowability of the concentrate. Within the hydrocyclone "nest" individual hydrocyclones can be installed or plugged to change process capacity to accommodate varying concentrations of both suspended and dissolved solids.

The enthalpy of steam collected in the steam chest is calculated (and in case the water is heated in total or in part by the flameless heat source (e.g., dynamic heat generator) its absorption is varied providing just enough energy to facilitate the process. Thereby, optimizing the efficiencies. The steam is collected and the heat of condensation is recovered, creating distilled water and increasing over all process efficiency. In some cases this distilled water is actually too clean for its intended use. In such cases heated water (bacteria killed) can be mixed with the distilled water providing water with the desired level of mineral content and increasing the over all water producing capacity of the process.

Various embodiments of the present invention will now be described in more detail.

Now referring to FIG. 1, a block diagram of a water purification system 100 in accordance with one embodiment of the present invention is shown. The water purification system 100 includes a high temperature water tank 102, a flameless heat source 112, a cylindrical vessel (hydrocyclone nest) 118, a first pump 148, a steam production meter 150, and a steam condenser and heat exchanger 152. The high temperature water tank 102 has a first water inlet 104, a second water inlet 106, a first water outlet 108 and a second water outlet 110. The flameless heat source 112 has an inlet 114 connected to the second water outlet 110 of the high temperature water tank 102 and an outlet 116 connected to the second water inlet 106 of the high temperature water tank 102. The flameless heat source 112 can be a dynamic heat generator, a Tesla generator, a geothermal source, an industrial process heat source, a power plant waste heat source or a combination thereof. A Tesla generator is a combination of a Tesla Turbine and Tesla Pump. A liquid is pumped, under pressure, into the center of the plate assembly (similar to injecting steam under pressure as in the Tesla Turbine) where half of the plates are rotated by a prime mover (engine, electric motor, windmill, or basically anything that rotates) and the other half of the plates are held stationary (as in the Tesla Pump). The Tesla generator heats any liquid introduced between the plates.

A controller 158 can be connected to the steam production meter 150 and the flameless heat source 112 to maintain the contaminated water within the high temperature water tank 102 within a specified temperature range based on a data from the steam production meter 150 or other sensors. The controller 158 can also be connected to other sensors within the system 100 and/or previously described devices in the system 100. For example, the specified temperature can be controlled by adjusting a flow rate of the water through the flameless heat source 112. The specified temperature can also be controlled by adjusting an absorption valve connected between the flameless heat source 112 and the low temperature water tank 102.

The dynamic heat generator may be similar or identical to devices provided by Island City, LLC or Twin Discs, Incorporated and typically includes a stationary housing having an input, an output, and a first set of radial vanes within the stationary housing, and a rotor disposed within the stationary housing having a second set of radial vanes. In particular embodiments, the dynamic heat generator is approximately twelve inches in diameter and six inches in width. These dimensions will vary depending on the desired throughput. In some embodiments it is made of aluminum, although it can be constructed from other materials in other embodiments. The dynamic heat generator may consist of only two moving parts. Running an engine around 1800RPMs spins the dynamic heat generator which causes internal wheels to rotate and compress the water molecules flowing there through, thereby causing friction that produces heat. The power source for the system can be an engine or electrical motor. The specified temperature can be greater than or equal to 212 degrees Fahrenheit (100 degrees Celsius), greater than a temperature required to kill pathogens within the water, greater than or equal to 250 degrees Fahrenheit (121 degrees Celsius), greater than or equal to 300 degrees Fahrenheit (148 degrees Celsius), greater than or equal to a temperature required to desalinate saltwater, greater than or equal to a temperature required to melt paraffin, greater than or equal to a temperature required to create steam, or any other desired temperature.

The cylindrical vessel (hydrocyclone nest) 118 is disposed within the high temperature water tank 102. The first pump 148 is connected to the first outlet 108 of high temperature water tank 102 and the inlet 130 of the cylindrical vessel 118. The steam production meter 150 is connected to the first outlet 122 of the cylindrical vessel 118. The steam condenser and heat exchanger 152 has a steam inlet 154 connected to the steam production meter 150 and a purified water outlet 156.

Referring now to FIGS. 2A-2E, a non-limiting example of the cylindrical vessel (hydrocyclone nest) 118 is shown. The cylindrical vessel (hydrocyclone nest) 118 has an overflow chamber 120 with a first outlet 122, an underflow chamber 124 with a second outlet 126, an inlet chamber 128 with an inlet 130 disposed between the overflow chamber 120 and the underflow chamber 124. One or more sets or stages of hydrocyclones 138 (see below) are disposed within the cylindrical vessel 118. The hydrocyclones 140 within each set of hydrocyclones 138 are arranged in a parallel configuration. Each hydrocyclone 140 has a tangential inlet 142 disposed within the inlet chamber 128 of the cylindrical vessel 118, a overflow 144 disposed within the overflow chamber 120 of the cylindrical vessel 118 and an underflow 146 disposed within the underflow chamber 124 of the cylindrical vessel 118.

Cross-sectional view A-A (FIG. 2B) shows a top of the cylindrical vessel (hydrocyclone nest) 118 and the top plate 202. Cross-sectional view B-B (FIG. 2C) shows a bottom of the overflow chamber 120 and cyclone upper plate 204, which is the hydrocyclone top holding fixture that is removed for cleanout of the inlet chamber 128. Cross-sectional view C-C (FIG. 2D) shows a top of the inlet chamber 128 and an expanded view of the inner stages 138*i*, 138*j* and 138*k* at a 1.5:1 scale to depict spare hydrocyclone holes with removeable cover plates 204 (as shown there are six (6)). The sets or stages of hydrocyclones 138*a*-138*k* are defined by dividers, barriers or rings 206 that cause the hydrocyclones 140 within a specific set or stage of hydrocyclones 138 to operate in parallel (see also FIG. 2E). Channels or passageways 208 direct the flow of contaminated water 160 from the output of a previous set or stage of hydrocyclones to the input of the next set or stage of hydrocyclones thus causing the sets or stages of hydrocyclones to operate in series. The arrows illustrate the flow of contaminated water 160 through the one or more sets or stages of hydrocyclones 138*a*-138*k*. Note that many different configurations can be used. For example, if only one set or stage of hydrocyclones 138 were used, all of the hydrocyclones 140 shown would operate in parallel. Alternatively, each concentric circle can be configured to operate as a set or stage of hydrocyclones 138 in which the hydrocyclones 140 shown would operate as five (5) sets or stages. Cross-sectional view D-D (FIG. 2E) shows a top of the underflow chamber 124. The timing for each stage through divider is slightly advanced from the upper inlet chamber 128 (see FIG. 2E). Any dimensions shown in the Figures or described herein are merely examples the embodiment shown. Other dimensions can be used. Likewise, other types of hydrocyclone nests or systems can be used.

Now referring to FIGS. 1 and 2A-2E, the contaminated water 160, which can be a sea water, a salt water, wastewater, sewage water, runoff water, storm drain water, produced water, frac water, ballast water, chiller water, well water or any other type of water-based liquid, is pumped into the first water inlet 104 of the high temperature water tank 102. The flameless heat source 112 heats the contaminated water within the high temperature water tank 102. The cylindrical vessel 118 is heated by the heated contaminated water within the high temperature water tank 102. The first pump 148 pumps the heated contaminated water into the inlet 130 of the cylindrical vessel 118 such that the heated contaminated water enters the tangential inlets 142 of the hydrocyclones 140. The hydrocyclones 140 separate the heated contaminated water into steam 162, and solids and concentrate 164. The steam 162 exits through the overflow 144 of the hydrocyclones 140 and the first outlet 122 of the cylindrical vessel 118. The solids and concentrate 164 exit through the underflow 146 of the hydrocyclones 140 and the second outlet 126 of the cylindrical vessel 118. The steam condenser and heat exchanger 152 converts the steam 162 into purified water 166. A steam demister 168 connected between the first outlet 122 of the cylindrical vessel 118 and the steam production meter 150 can be used to coalesce and remove contaminated water droplets from the steam 162. In addition, clean water can be added to the purified water 166 if distilled water is not desired.

In one embodiment, the hydrocyclones 140 are arranged so that their tangential inlets 142 are in parallel within each stage. Each stage is in series with the stages that precede and follow it. The final stage is emptied by an eductor 170 connected to the second outlet 126 of the cylindrical vessel 118, which creates a vacuum and pneumatically carries the waste water or solids away for disposal.

In another embodiment, the stages are arranged in concentric circles with the greater number of stages (and hydrocyclones) contained in the outer circles, reducing in their numbers toward the center. By carefully controlling the heat flux of the water in the water jacket surrounding the hydrocyclone "nest", the process can flash more or less water, as required by the application, while sterilizing the unflashed water and minimizing suspended solids.

Figure 3:
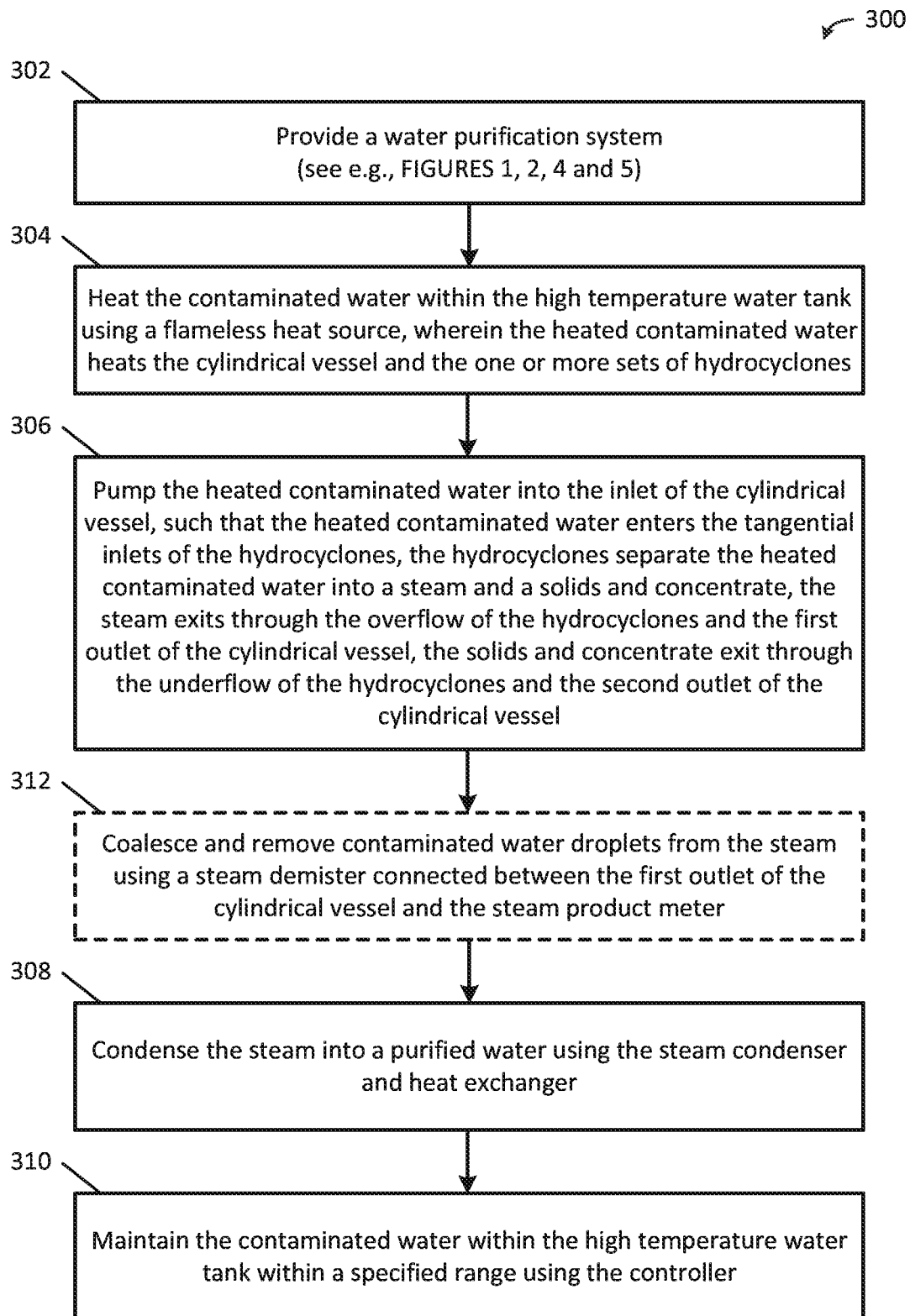
FIG. 3 is a flow chart of a method for purifying water in accordance with one embodiment of the present invention is shown.

Now referring to FIG. 3, a flow chart of a method for purifying water 300 in accordance with one embodiment of the present invention is shown. A water purification system is provided in block 302, such as described in FIGS. 1, 2, 4 and 5 or other suitable system. The contaminated water within the high temperature water tank is heated using a flameless heat source in block 304, wherein the heated contaminated water heats the cylindrical vessel and the one or more sets of hydrocyclones. The heated contaminated water is pumped into the inlet of the cylindrical vessel in block 306 such that the heated contaminated water enters the tangential inlets of the hydrocyclones, the hydrocyclones separate the heated contaminated water into steam and solids/concentrate, the steam exits through the overflow of the hydrocyclones and the first outlet of the cylindrical vessel, the solids and concentrate exit through the underflow of the hydrocyclones and the second outlet of the cylindrical vessel. The steam is condensed into purified water using the steam condenser and heat exchanger in block 308. The contaminated water within the high temperature water tank is maintained within a specified temperature range using the controller in block 310. Optionally, contaminated water droplets can be coalesced and removed from the steam using a steam demister connected between the first outlet of the cylindrical vessel and the steam production meter in block 312.

The process described above is one of continual "thru put" (once temperature stabilization has been achieved). But, the present invention can also be programmed to allow "batch" processing. This can be a very important feature when the wastewater to be processed has more than one component that needs to removed and separated. Examples include are but not limited to mine runoff water and electroplating rinse water. In both cases the water contains acid and heavy metals. In operation, the "batch" is processed at a temperature that allows one component to "boil" off while leaving the remaining components in the wastewater outflow. This outflow becomes the inflow to the new "batch". The process temperature is changed to allow another component to "boil" off. This process can occur as many times as necessary and the only requirement is that various components have different boiling points.

Figure 4:
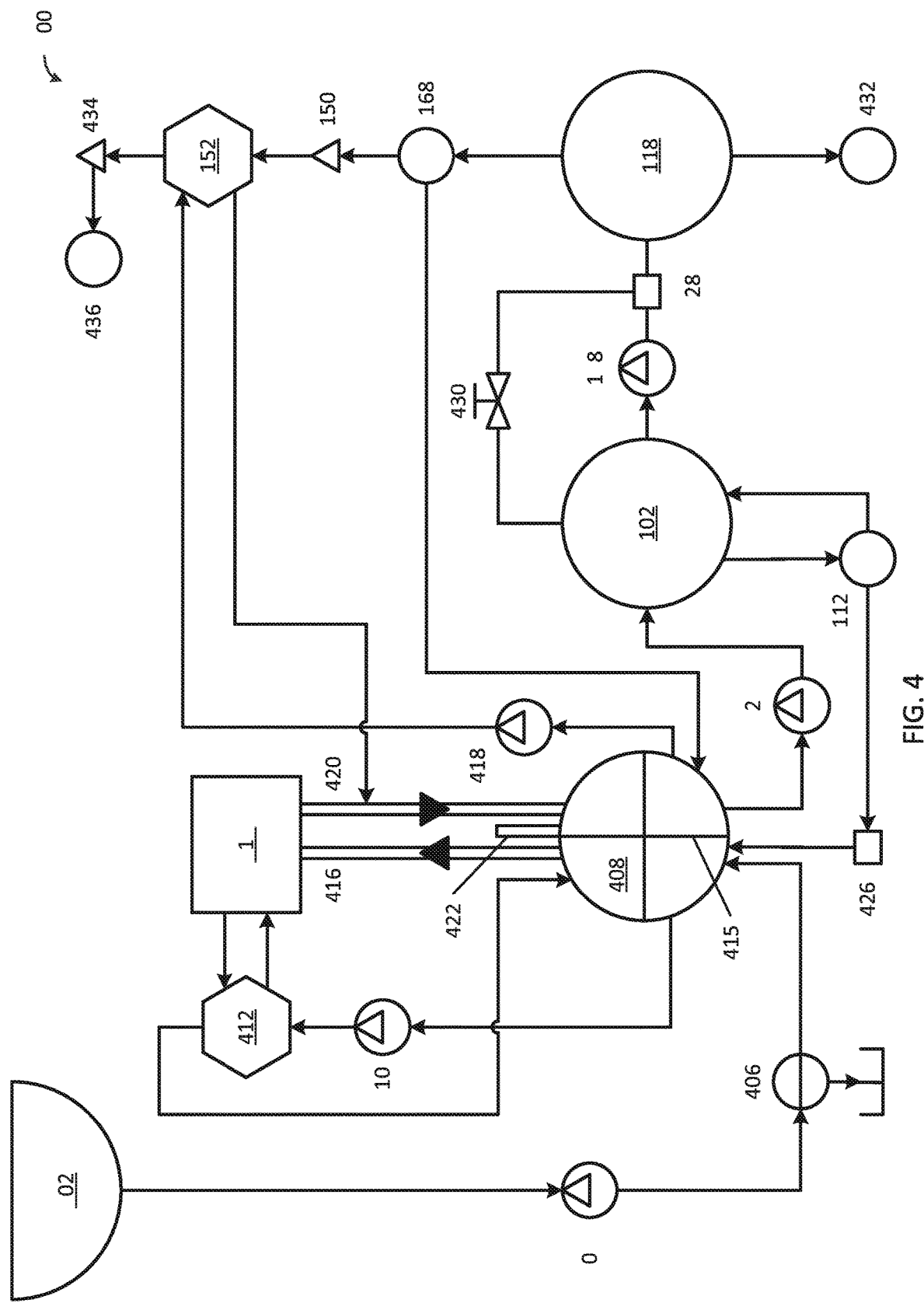
FIG. 4 is a process flow diagram of a method for purifying water in accordance with another embodiment of the present invention.

Referring now to FIG. 4, a process flow diagram of a method for purifying water 400 in accordance with another embodiment of the present invention is shown. A third water pump 404 pumps contaminated water from a source of contaminated water 402 through an oil/solids separator 406 (e.g., a hydrocyclone), which removes oil and solids from the contaminated water, and into a low temperature water tank 408. A fifth water pump 410 pumps water to the engine water jacket and accessories heat exchanger 412. Heat from the engine 414 water jacket and accessories is transferred to the engine jacket water and accessories heat exchanger 412. Heated water then flows back to the low temperature water tank 408. Volatile gas dissolved in the water on the left side of the baffle 415 separating the low temperature water tank 408 is vaporized and introduced into the engine intake 416 and is burned along with the fuel.

The fourth water pump 418 pumps water from the right side of the baffle 415 in the low temperature water tank 408 to the steam heat recovery heat exchanger 152. Heated water then flows from the steam heat recovery heat exchanger 152 to the engine exhaust 420 where it is mixed with hot exhaust gases and the two flow together, exchanging heat, back in to the low temperature water tank 408. The cooled exhaust gases now flow out of the low temperature water tank 408 via a vent 422 into the atmosphere.

The second water pump 424 pumps water from the low temperature water tank 408 into the high temperature water tank 102. A flameless heat source 112, such as a dynamic heat generator, pumps and heats water from the high temperature water tank 102. An absorption valve 426 adjusts the pressure, by diverting a portion of the flow from within the flameless heat source 112 to change the amount of heat generated and flowing into the high temperature water tank 102.

The first water pump 148 pumps water from high temperature water tank 102 to the hydrocyclone "nest" 118 which is physically mounted in the high temperature water tank 102. Temperature valve 428 allows water to circulate from the first water pump 148 thru an adjustable orifice 430, which creates a pressure drop, and into high temperature water tank 102 until the required water temperature is achieved.

The high temperature water enters the heated hydrocyclone "nest" 118 under pressure and enters the first stage of heated hydrocyclones. Flowing tangentially into each heated hydrocyclone 140; the water's kinetic energy creates "G" forces. These "G" forces cause the flow of water to laminate, forcing suspended and dissolved solids with mass to the outside creating a low pressure area to the inside of the heated hydrocyclone 140. Vertical velocity takes this flow to the bottom of each heated hydrocyclone 140 where the water is allowed to flash to steam. Concentrated water that does not flash to steam is allowed to flow to the second heated hydrocyclone stage. This process continues to additional stages until the desired conversion of water to steam is attained. Concentrated water along with suspended solids flow from the last stage and into concentrate tank 432.

Steam is combined from all the hydrocyclone stages in the heated hydrocyclone "nest" 118 and flows through a steam demister 168 where contaminated water droplets are coalesced and removed from the steam. Thereafter, the steam flows to the steam production meter 150. The steam production meter 150 measures the flow, temperature and pressure of the steam. An imbedded algorithm (controller) calculates the amount of heat energy in the steam and modulates the absorption valve 424 to make certain that steam production is optimized. Steam flows from the steam production meter 150 into the steam heat recovery heat exchanger 152 where heat is removed from the steam turning it to water and heating water flowing from the low temperature water tank 408 and to the engine exhaust 420. Condensed water from the steam heat recovery heat exchanger 152 flows through the water custody transfer meter 434 where it is sold to the customer and stored in fresh water tank 436.

Figure 5:
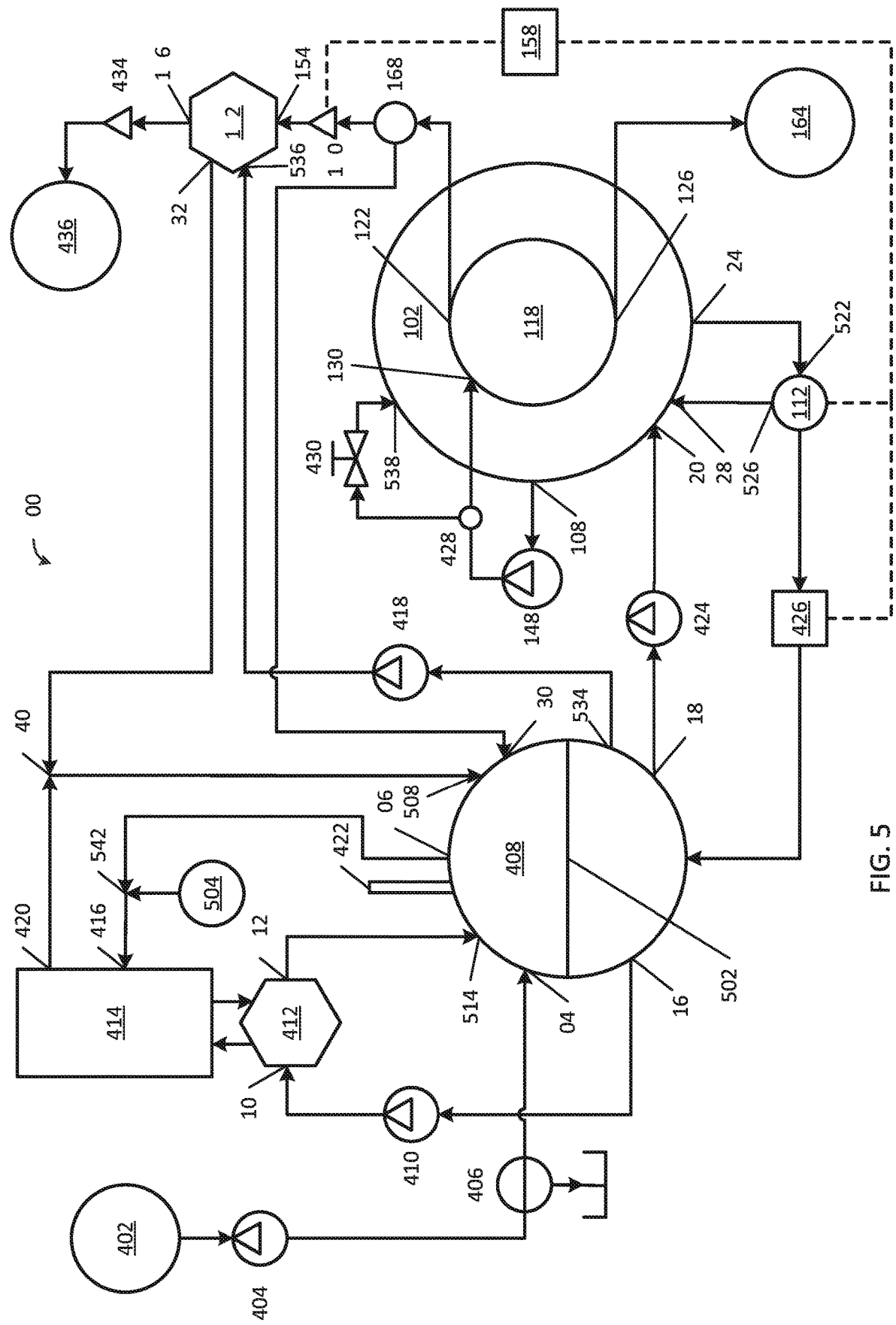
FIG. 5 is a block diagram of a water purification system in accordance with another embodiment of the present invention.

Now referring to FIG. 5, a block diagram of a water purification system 500 in accordance with one embodiment of the present invention is shown. The water purification system includes a source of contaminated water 402, an oil/solids separator 406, a third pump 404, a low temperature water tank 408, an engine 414, a heat exchanger 412, a fifth pump 410, a high temperature water tank 102, a second pump 424, a flameless heat source 112, a heat absorption valve 426, a cylindrical vessel (hydrocyclone nest) 118, a first pump 148, a steam demister 168, a steam production meter 150, a steam condenser and heat exchanger 152, and a fourth pump 418. The contaminated water can be a sea water, a salt water, wastewater, sewage water, runoff water, storm drain water, produced water, frac water, ballast water, chiller water, well water or any other type of water-based liquid. The third pump 404 is connected to the source of the contaminated water 402 and the oil/solids separator 406. The low temperature water tank 408 has a liquid/gas separator 502, a first inlet 504 connected to the oil/solids separator 406, a second inlet 508, a third inlet 514, a fourth inlet 530, a first water outlet 518, a second water outlet 534, a third water outlet 516, a gas outlet 506, and a vent 422 that allows cooled exhaust gases to flow out of the low temperature water tank 408 into the atmosphere.

The engine 414 has a fuel intake 416 connected to a fuel tank 504 and the gas outlet 506 of the low temperature water tank 408, and an exhaust 420 connected to the second inlet 508 of the low temperature water tank 408. The heat exchanger 412 is thermally connected to the engine 414 to cool the engine 414, and has a water inlet 510 and a water outlet 512 connected to the third inlet 514 of the low temperature water tank 408. The fifth pump 410 is connected to the third water outlet 516 of the low temperature water tank 408 and the water inlet 510 of the heat exchanger 412.

The high temperature water tank 102 has a first water inlet 520, a second water inlet 528, a third water inlet 538, a first water outlet 108 and a second water outlet 524. The second pump 424 is connected to the first water outlet 518 of the low temperature water tank 408 and the first inlet 520 of the high temperature water tank 102. The flameless heat source 112 has an inlet 522 connected to the second water outlet 524 of the high temperature water tank 102 and an outlet 526 connected to the second water inlet 528 of the high temperature water tank 102. The flameless heat source 112 can be a dynamic heat generator, a Tesla generator, a geothermal source, an industrial process heat source, a power plant waste heat source or a combination thereof. A Tesla generator is a combination of a Tesla Turbine and Tesla Pump. A liquid is pumped, under pressure, into the center of the plate assembly (similar to injecting steam under pressure as in the Tesla Turbine) where half of the plates are rotated by a prime mover (engine, electric motor, windmill, or basically anything that rotates) and the other half of the plates are held stationary (as in the Tesla Pump). The Tesla generator heats any liquid introduced between the plates. The heat absorption valve 426 is connected between the flameless heat source 112 and the low temperature water tank 408.

A controller 158 can be connected to the steam production meter 150 and the flameless heat source 112 or the heat absorption valve 426 or both the flameless heat source 112 and the heat absorption valve 426 to maintain the contaminated water within the high temperature water tank 102 within a specified temperature based on a data from the steam production meter 150 or other sensors. The controller 158 can also be connected to other sensors within the system 100 and/or previously described devices in the system 100. For example, the specified temperature can be controlled by adjusting a flow rate of the water through the flameless heat source 112. The specified temperature can also be controlled by adjusting an absorption valve connected between the flameless heat source 112 and the low temperature water tank 102.

The dynamic heat generator may be similar or identical to devices provided by Island City, LLC and typically includes a stationary housing having an input, an output, and a first set of radial vanes within the stationary housing, and a rotor disposed within the stationary housing having a second set of radial vanes. In particular embodiments, the dynamic heat generator is approximately twelve inches in diameter and six inches in width. In some embodiments it is made of aluminum, although it can be constructed from other materials in other embodiments. The dynamic heat generator may consist of only two moving parts. Running an engine around 1800 RPMs spins the dynamic heat generator which causes internal wheels to rotate and compress the water molecules flowing therethrough, thereby causing friction that produces heat. The power source for the system can be an engine or electrical motor. The specified temperature can be greater than or equal to 212 degrees Fahrenheit (100 degrees Celsius), greater than a temperature required to kill pathogens within the water, greater than or equal to 250 degrees Fahrenheit (121 degrees Celsius), greater than or equal to 300 degrees Fahrenheit (148 degrees Celsius), greater than or equal to a temperature required to desalinate saltwater, greater than or equal to a temperature required to melt paraffin, greater than or equal to a temperature required to create steam, or any other desired temperature.

The cylindrical vessel (hydrocyclone nest) 118 is disposed within the high temperature water tank 102. An example of the cylindrical vessel (hydrocyclone nest) 118 was previously described in reference to FIGS. 1 and 2. Other cylindrical vessels (hydrocyclone nest) 118 and sets of hydrocyclones can be used. The first pump 148 is connected to the first outlet 108 of high temperature water tank 102 and the inlet 130 of the cylindrical vessel 118. A solids and concentrate tank 164 is connected to the second outlet 126 of the cylindrical vessel 118. A water temperature valve 428 is connected between the first pump 148 and the inlet 130 of the cylindrical vessel 118. An adjustable orifice 430 is connected to the water temperature valve 428 and a third water inlet 538 of the high temperature water tank 102.

A steam demister 168 is connected to the first outlet 122 of the cylindrical vessel and the fourth inlet 530 of the low temperature water tank 408. The steam production meter 150 is connected to the steam demister 168. The steam condenser and heat exchanger 152 has a steam inlet 154 connected to the steam production meter 150, a purified water outlet 156, a water inlet and a water outlet 532 connected to the second inlet 508 of the low temperature water tank 408 and engine exhaust 420. The fourth pump 418 is connected to the second water outlet 534 of the low temperature water tank 408 and the water inlet 536 of the steam condenser and heat exchanger 152. A custody transfer meter 434 is connected to the purified water outlet 156 of the steam condenser and heat exchanger 152. A purified water tank 436 is connected to the custody transfer meter 434.

Note that a first mixing device 540 can be disposed between and connected to the exhaust 420 of the engine 414, the water outlet 532 of the steam condenser and heat exchanger 152 and the second inlet 508 of the low temperature water tank 408 to properly mix, control pressures and prevent backflows of the engine exhaust and water. Similarly, a second mixing device 542 can be disposed between and connected to the fuel intake 416 of the engine 414, the fuel tank 504 and the gas outlet 506 of the low temperature water tank 408 to properly mix, control pressures and prevent backflows of the fuel and volatile gases.

Particular embodiments of the present invention can be portable (e.g., trailer mounted, etc.) or permanently placed and may be set up in remote areas (e.g., drilling or mining sites) or disaster locations where potable water is necessary for survival. In some embodiments, no open flames or heating elements are required to heat water to the specified temperature or higher. In addition, the system has the ability to produce electricity for lighting, by adding a generator set to the system, and radiant heat for warming homes or buildings.

When salt water treatment is required, the water that has reached a temperature of 212 degrees Fahrenheit (100 degrees Celsius) may be run through a hydrocyclone causing a vacuum which then flashes the water to steam. At that point, the salt is separated from the water and the concentrated salt brine falls through the bottom of the hydrocyclone while the pure steam escapes and flows through a heat exchanger that condenses it back to a liquid form.

Figure 6A:
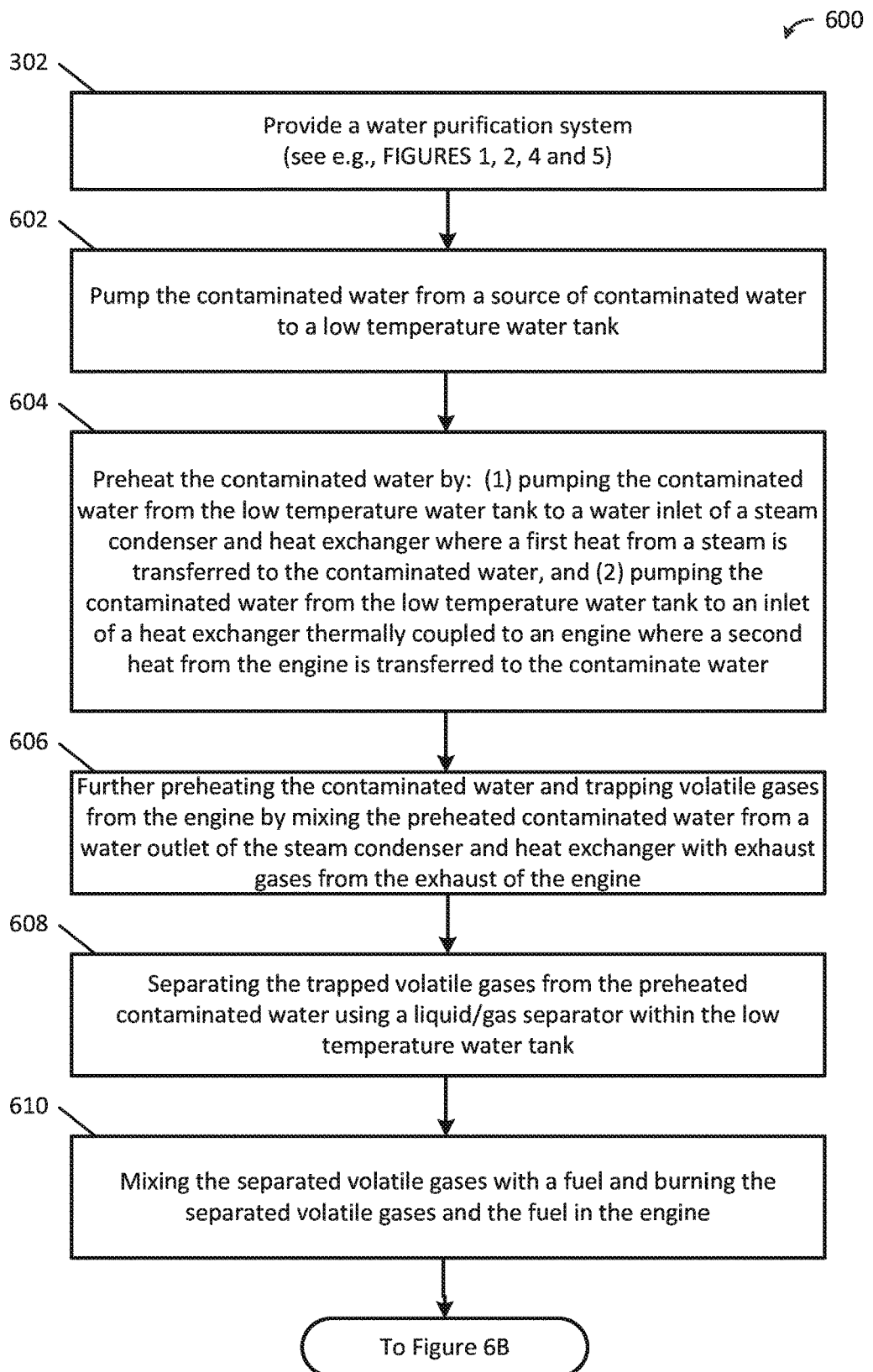
FIGS. 6A-6B are a flow chart of a method for purifying water in accordance with another embodiment of the present invention is shown.
Figure 6B:
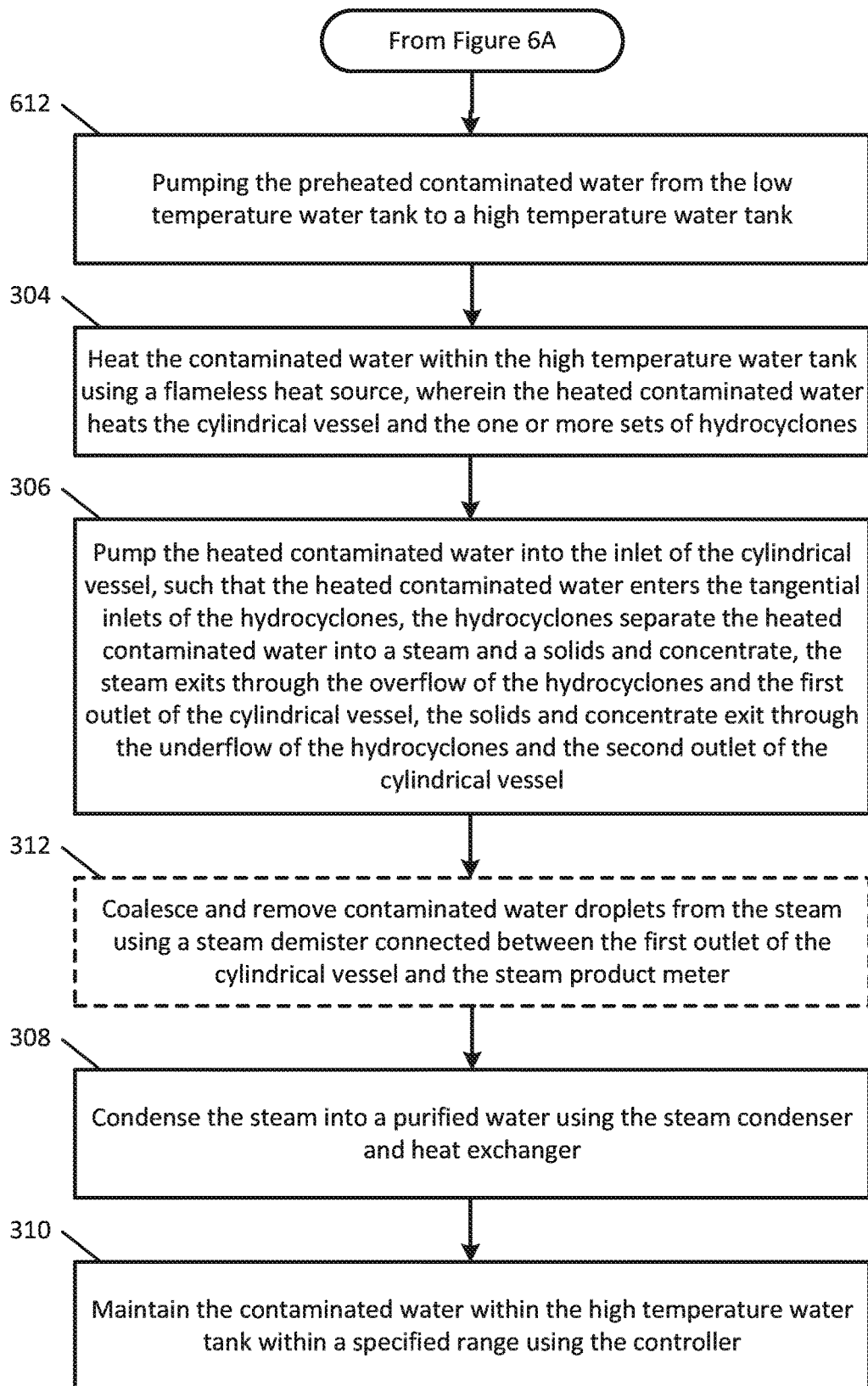

Referring now to FIGS. 6A-6B, a flow chart of a method for purifying water 600 in accordance with one embodiment of the present invention is shown. A water purification system is provided in block 302, such as described in FIGS. 1, 2, 4 and 5 or other suitable system. Contaminated water is pumped from a source of contaminated water into a low temperature water tank in block 602. Note that oil and/or solids can be removed from the contaminated water before the contaminated water enters the low temperature water tank. The contaminated water is preheated in block 604 by: (1) pumping the contaminated water from the low temperature water tank to a water inlet of a steam condenser and heat exchanger where a first heat from a steam is transferred to the contaminated water, and (2) pumping the contaminated water from the low temperature water tank to an inlet of a heat exchanger thermally coupled to an engine where a second heat from the engine is transferred to the contaminated water. The contaminated water is further preheated and volatile gases from the engine are trapped by mixing the preheated contaminated water from a water outlet of the steam condenser and heat exchanger with exhaust gases from the exhaust of the engine in block 606. The trapped volatile gases are separated from the preheated contaminated water using a liquid/gas separator within the low temperature water tank in block 608. The separated volatile gases are mixed with a fuel, and the separated volatile gases and the fuel are burned in the engine in block 610. The preheated contaminated water is pumped from the low temperature water tank to a high temperature water tank in block 612.

The preheated contaminated water within the high temperature water tank is heated using a flameless heat source in block 304, wherein the heated contaminated water heats the cylindrical vessel and the one or more sets of hydrocyclones. The heated contaminated water is pumped into the inlet of the cylindrical vessel in block 306 such that the heated contaminated water enters the tangential inlets of the hydrocyclones, the hydrocyclones separate the heated contaminated water into steam and solids/concentrate, the steam exits through the overflow of the hydrocyclones and the first outlet of the cylindrical vessel, the solids and concentrate exit through the underflow of the hydrocyclones and the second outlet of the cylindrical vessel. The steam is condensed into purified water using the steam condenser and heat exchanger in block 308. The contaminated water within the high temperature water tank is maintained within a specified temperature range using the controller in block 310. The contaminated water droplets can be coalesced and removed from the steam using a steam demister connected between the first outlet of the cylindrical vessel and the steam production meter in block 312.

Figure 7:
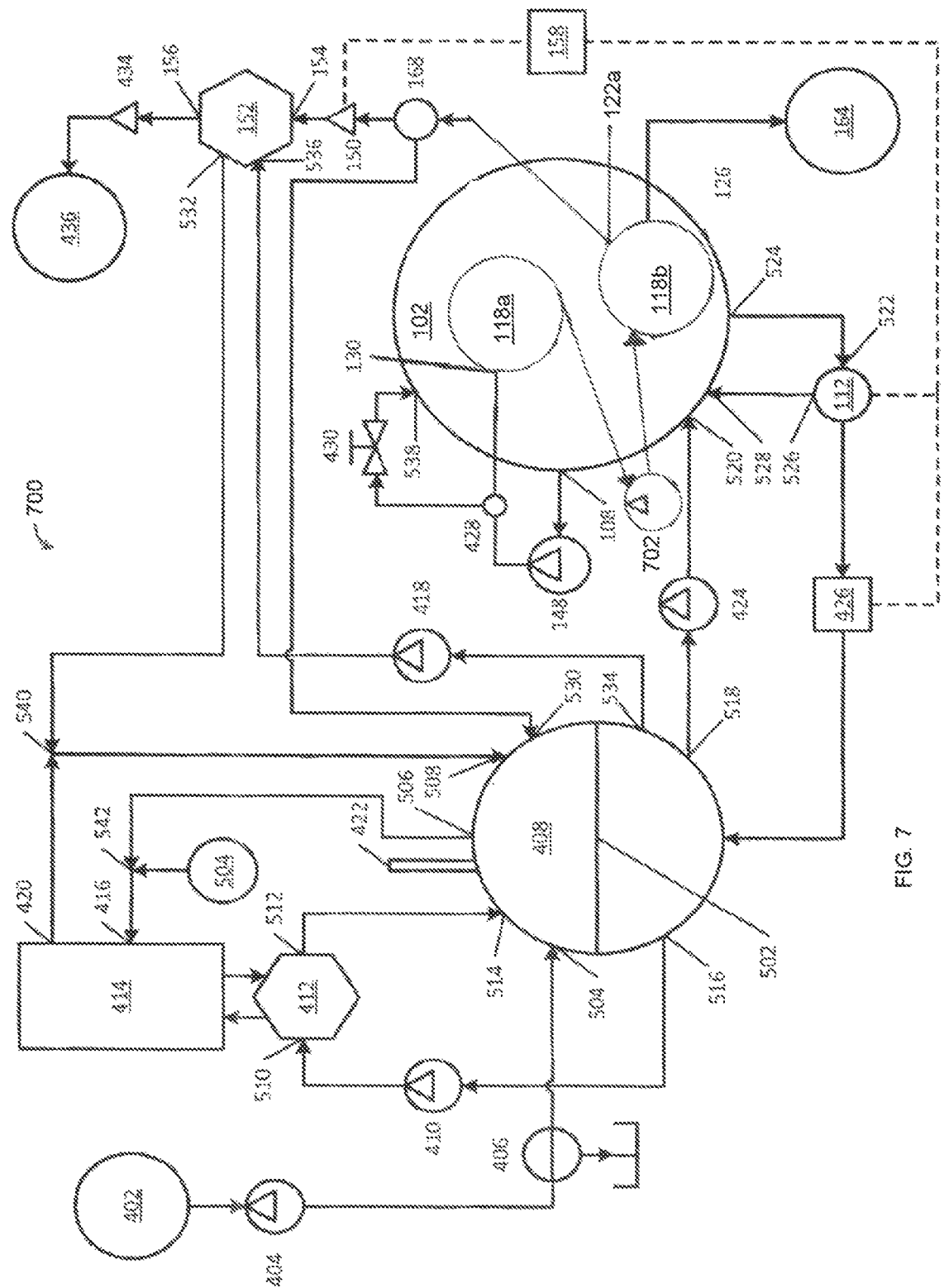
FIG. 7 is a block diagram of a water purification system in accordance with another embodiment of the present invention, similar to the embodiment shown in FIG. 5.

FIG. 7 is a block diagram of a system 700 in accordance with another embodiment of the present invention, in which the cylindrical vessel comprises a first cylindrical vessel 118a disposed within the high temperature water tank 102, the one or more sets of hydrocyclones comprise a first set of hydrocyclones disposed within the first cylindrical vessel 118a and a second set of hydrocyclones disposed within a second cylindrical vessel 118b disposed within the high temperature water tank 102. As shown in FIG. 7, an outlet of the first cylindrical vessel 118a is connected to an inlet of the second cylindrical vessel 118b; and a first outlet of the second cylindrical vessel is connected to the steam production meter.

As shown in FIG. 7, the system 700 may include a sixth pump 702 connected between the outlet of the first cylindrical vessel and the inlet of the second cylindrical vessel.

Although the present invention has been described in detail with reference to particular embodiments, it should be understood that various other changes, substitutions, and alterations may be made hereto without departing from the spirit and scope of the present invention. For example, although the present invention has been described with reference to a number of components included within various systems, these components may be combined, rearranged, re-sized or positioned in order to accommodate particular needs and applications. The present invention contemplates great flexibility in the arrangement of these elements as well as their internal components.

For example, some embodiments may utilize an engine or mechanism other than a diesel engine to drive the dynamic heat generator. Depending on particular needs and applications, particular embodiments may not utilize one or more components such as one or more of the illustrated heat exchangers, filters and pumps. Numerous other changes, substitutions, variations, alterations and modifications may be ascertained by those skilled in the art and it is intended that the present invention encompass all such changes, substitutions, variations, alterations and modifications as falling within the spirit and scope of the appended claims.

What is claimed is:

1. An apparatus for use in water purification comprising:
a cylindrical vessel comprising, within the cylindrical vessel, a first set of hydrocyclones, at least one intermediate set of hydrocyclones, and a final set of hydrocyclones, the sets of hydrocyclones arranged in series, wherein the hydrocyclones within each set of hydrocyclones are arranged in a parallel configuration, wherein each set of hydrocyclones is defined by a divider which causes the hydrocyclones in each set to operate in parallel,
and wherein each hydrocyclone has
a tangential inlet disposed within an inlet chamber of the cylindrical vessel and in fluid communication with an inlet connected to the inlet chamber,
an overflow disposed within an overflow chamber of the cylindrical vessel, and
an underflow disposed within an underflow chamber of the cylindrical vessel.

2. The apparatus as recited in claim 1 wherein the cylindrical vessel is disposed within a high temperature water tank having a first water inlet, a second water inlet, a first water outlet and a second water outlet; wherein the high temperature water tank is a component of a water purification system.

3. The apparatus as recited in claim 2 further comprising a source of heated water in fluid communication with the high temperature water tank.

4. The apparatus as recited in claim 1 wherein the sets of hydrocyclones are arranged in concentric circles in the cylindrical vessel.

5. An apparatus for use in water purification comprising:
- a cylindrical vessel comprising, within the cylindrical vessel, a first set of hydrocyclones, and a second set of hydrocyclones, the first set of hydrocyclones and the second set of hydrocyclones arranged in series, wherein the hydrocyclones within each set of hydrocyclones are arranged in a parallel configuration, wherein the first set of hydrocyclones is connected in series to the second set of hydrocyclones by a passageway,
- and wherein each hydrocyclone has
- a tangential inlet disposed within an inlet chamber of the cylindrical vessel and in fluid communication with an inlet connected to the inlet chamber,
- an overflow disposed within an overflow chamber of the cylindrical vessel, and
- an underflow disposed within an underflow chamber of the cylindrical vessel.

6. The apparatus as recited in claim 5 wherein the cylindrical vessel is disposed within a high temperature water tank having a first water inlet, a second water inlet, a first water outlet and a second water outlet; wherein the high temperature water tank is a component of a water purification system.

7. The apparatus as recited in claim 6 further comprising a source of heated water in fluid communication with the high temperature water tank.

8. An apparatus, comprising:
- a cylindrical vessel comprising, within the cylindrical vessel, a first set of hydrocyclones, at least one intermediate set of hydrocyclones, and a final set of hydrocyclones, the sets of hydrocyclones arranged in series, wherein the hydrocyclones within each set of hydrocyclones are arranged in a parallel configuration, wherein each set of hydrocyclones is separated from adjacent sets of hydrocyclones by a divider which causes the hydrocyclones in each set to operate in parallel.

9. The apparatus as recited in claim 8, wherein each hydrocyclone has:
- a tangential inlet disposed within an inlet chamber of the cylindrical vessel and in fluid communication with an inlet connected to the inlet chamber,
- an overflow disposed within an overflow chamber of the cylindrical vessel, and
- an underflow disposed within an underflow chamber of the cylindrical vessel.

10. The apparatus as recited in claim 8 wherein the cylindrical vessel is disposed within a high temperature water tank having a first water inlet, a second water inlet, a first water outlet and a second water outlet; wherein the high temperature water tank is a component of a water purification system.

11. The apparatus as recited in claim 10 further comprising a source of heated water in fluid communication with the high temperature water tank.

12. The apparatus as recited in claim 8 wherein the sets of hydrocyclones are arranged in concentric circles in the cylindrical vessel.

* * * * *